(12) United States Patent
Ziegler

(10) Patent No.: US 6,416,614 B1
(45) Date of Patent: Jul. 9, 2002

(54) METHOD FOR THE PRODUCTION OF A CELLULAR COMPOSITE MATERIAL

(75) Inventor: Maik Ziegler, Weissach (DE)

(73) Assignee: Fraunhofer-Gesellschaft zur Förderung der angewandten Gesellschaft, München (DE)

( * ) Notice: Subject to any disclaimer, the term of this patent is extended or adjusted under 35 U.S.C. 154(b) by 0 days.

(21) Appl. No.: 09/445,981

(22) PCT Filed: Mar. 29, 1999

(86) PCT No.: PCT/EP99/02156

§ 371 (c)(1),
(2), (4) Date: Dec. 15, 1999

(87) PCT Pub. No.: WO99/56949

PCT Pub. Date: Nov. 11, 1999

(30) Foreign Application Priority Data

May 2, 1998 (DE) ............................................ 198 19 750

(51) Int. Cl.⁷ ............................ B32B 31/04; B32B 31/28
(52) U.S. Cl. ..................... 156/308.2; 156/78; 156/245; 156/272.2; 264/122; 264/257
(58) Field of Search ....................... 156/78, 245, 272.2, 156/308.2; 264/109, 122, 257

(56) References Cited

U.S. PATENT DOCUMENTS 4,268,649 A * 5/1981 Jellinek et al. ............. 525/504
5,413,661 A * 5/1995 Spengler et al. ............ 156/515
6,033,770 A * 3/2000 Matsuki et al. ............. 428/132

FOREIGN PATENT DOCUMENTS

| DE | 14 79 995 | 2/1969 |
| DE | 195 44 451 | 6/1997 |
| EP | 04 25 923 | 5/1991 |
| EP | 569 955 A2 * | 5/1993 |
| JP | 09 05 9417 | 3/1997 |
| JP | 63 176 114 | 7/1998 |
| WO | WO 93 11 927 | 1/1993 |

* cited by examiner

Primary Examiner—Sam Chuan Yao
(74) Attorney, Agent, or Firm—Paul Vincent

(57) ABSTRACT

A composite material consists essentially of a particle foam comprising expanded polypropylene (EPP), at least one fiber layer and at least one polymer introduced onto this layer. An intimate connection is secured in that the fiber layer is a mixed fiber layer comprising a fraction of fibers made from polypropylene (PP) which are welded to the EPP particles and with an additional fraction of reinforcing fibers which have a sufficient wetability for the hardening, curing or cross-linking polymer introduced onto the free surface of the fiber layer in the liquid phase. A method for producing these composite materials is also described.

7 Claims, 1 Drawing Sheet

METHOD FOR THE PRODUCTION OF A CELLULAR COMPOSITE MATERIAL

BACKGROUND OF THE INVENTION

The invention concerns a composite material consisting essentially of a particle foam made from expanded polypropylene (EPP), at least one fiber layer, and a layer introduced thereon made from a polymer, as well as a method for producing a molded component comprising such a composite material.

Thermoplastic polymers and foams produced through expansion thereof have many applications. Disadvantageously, the material is not well suited for the manufacture of intimately joined composite materials. This is primarily due to the very poor surface bonding properties. This is especially the case for all polyolefines and, in particular, for the widely used polypropylene. Expanded polymers are normally used as an insulating layer to provide acoustical insulation, heat insulation or shock insulation. They can, however, only accept limited forces and are neither diffusion tight nor resistant to abrasion. In most applications, the foam material must therefore be coated at one side or completely encased, wherein the coating or casing material provides e.g. a smooth, rigid surface and imparts the required strength to the molded component. This layer therefore comprises reinforcement fibers upon which e.g. a duroplastic material is impregnated, sprayed, or applied in a similar fashion.

With a composite material of this kind, the foam is first produced, shaped and joined to the fiber reinforced layer, whereupon the duroplastic layer is applied. Alternatively, the prefabricated, impregnated fiber layer is joined to the foam body. This is done using glue, solvents or the like. To the extent that the molded component has a closed jacket, this jacket is conventionally prefabricated and subsequently expanded. The former method is difficult and generally not particularly acceptable from an environmental point of view. Disjoining of laminations can occur in response to loads. The second method produces articles which do not have an intimate connection between the cover layer and the foam body, in consequence of which, associated loading of the cover layer causes the foam body to tear and, under certain circumstances, the foam structure is destroyed.

DE-OS 14 79 995 describes a method for producing a laminate with which the surface of a layer made from a thermoplastic polymer material is bound to a fabric containing glass fibers as well as fibers comprising a thermoplastic polymer material in such a fashion that the polymer material of the thermoplastic layer is melted together with thermoplastic polymer fibers of the fabric. The layered body thereby produced can be reinforced through incorporation of resins on the fabric side, strengthened by fiber glass layers. Towards this end, neither the use of a particle foam as a layer made from a thermoplastic polymer material nor the application to the fabric of a layer made from a rigid polymer, cured or cross-linked from the fluid phase, is envisioned.

DE 41 41 113 A1 discloses a composite body in the form of a cover member for inside use in motor vehicles having a support member made from polyolefine particle foam, a decorative layer preferentially substantially made from a polyolefine polymer on a multi-layer weave or fabric primarily made from polyolefine polymer threads, as well as foils laminated on one or both sides of the fabric made from a polyolefine material. With this composite body, the particle foam is not welded to the fabric and there is no layer made from a rigidly curing or cross-linking polymer introduced in the liquid phase.

SUMMARY OF THE INVENTION

It is the underlying purpose of the invention to create a composite material with the above mentioned structure with which a firm connection is guaranteed both between the EPP particle foam and the fiber reinforced layer as well as between that layer and the polymer layer applied thereto without the assistance of additives such as glues, solvents or the like. The invention is also directed to a method for manufacturing a molded component using a composite material of this type.

The first purpose is achieved in accordance with the invention using a composite material of the above mentioned kind in that the fiber layer comprises mixed fibers having a fraction of fibers made from polypropylene (PP) which are welded to the particle foam and an additional amount of reinforcing fibers, which can be sufficiently wet by the rigidly curing or cross-linking polymer applied to the free surface of the fiber layer in the liquid phase.

The mixed fiber layer in accordance with the invention serves two purposes within the composite material. It provides the conventional reinforcement function with regard to pressure and tensile strength and also effects bonding between the fiber layer and the PP particle foam, since it contains PP fibers which, during melting of the particle foam, undergo an intimate welding connection thereto. In this manner, a strong connection is effected between the mixed fiber layer and the particle foam made from EPP. In addition, the free surface of the fiber layer has sufficient wetability for impregnation with a rigidly curing or cross-linking polymer, so that a layer having the required properties (e.g. smooth surface, abrasion resistance, proper spray behavior and scratch resistance and the like) is introduced onto the compound comprising the mixed fiber layer and the EPP particle foam. The layer introduced on the free surface of the fiber layer made from the hardening, curing or cross linking polymer can, for its part, have a plurality of layers (e.g. a sandwich-type structure). The compound material in accordance with the invention can be produced in plates or as a three dimensional molded component, optionally even as a hollow component e.g. through forming and shaping of the composite material on a core.

The EPP/fiber compound has extremely high tensile and shear strength. Compared to other particle foams, in particular the commonly used polystyrene foam, the composite material in accordance with the invention is characterized by a very high restoring capability to avoid pressed-in locations. The ability to withstand high temperatures is also advantageous in many applications.

The composite material in accordance with the invention is therefore particularly well suited for surfboards, wave gliders, hulls, skies of various types and other kinds of sporting equipment, planes, insulated containers, housings, motor vehicle inner coverings and chassis components such as bumpers and front hoods etc.

The particle foam can be a compound foam comprising EPP and an additional expanded polymer e.g. EPS (expanded polystyrene) and/or EPE (expanded polyethylene). In this case as well, the mixed fiber layer has a fraction of PP fibers forming an intimate connection with the EPP particles in the particle foam.

The polymer introduced in the liquid phase on the free outer surface of the fiber layer can e.g. be a thermoplastic applied to the mixed fiber layer using arbitrary conventional methods such as injection molding or low pressure injection molding, through pressing, extruding or co-extruding, thermoplastic foam molding, heat molding, flame spraying, using continuous casting techniques or swell-flow procedures. The thermoplastic applied in a heat-melted liquid phase, e.g. polyolefine, PVC, polystyrene, polyacrylic etc., becomes rigid on the mixed fiber layer when cooled to thereby function not only as a bonding agent and for reinforcement, rather, in particular, to also effect heat insulation so that the particle foam is not damaged during spray application, extrusion application or the like. Use of the mixed fiber layer in accordance with the invention between the particle layer and the applied liquid phase thermoplastic makes the production of such a compound material possible, since the heat energy of the melted liquid thermoplastic when introduced onto the particle foam, would otherwise lead to a freeing of the gases enclosed therein and to a collapse of the particle foam and a smooth surface could not be obtained. When, for example, the thermoplastic introduced in the liquid phase is polypropylene (PB), the composite material is distinguished by a very high degree of material uniformity and by low material and production costs.

The polymer introduced in the liquid phase can also be a cross-linking polymer in the form of an elastomer, e.g. a caoutchouc. An elastomer facilitates additional properties of the surface region such as an increased gripping capability, and attenuation of pressure and collision forces, etc.

Clearly, a cross-linking polymer in the form of a duroplastic can also be introduced on the free surface of the mixed fiber layer. The duroplastic and the elastomer can be applied in an arbitrary manner, e.g. using slush techniques, impregnation, soaking, spraying or reaction injection molding (RIM), RRIM (reinforced reaction injection molding), or SRIM (structural reaction injection molding) based on rapid dosing and mixing of the liquid duroplastic components, injection of the reactive mixture onto the mixed fiber layer, and rapid curing. In addition, e.g. liquid monomers or oligomers having powder polymers mixed therein can also be utilized, wherein the powder polymers act as crystallization seeds during curing or cross-linking on the mixed fiber layer and the cured or cross-linked polymer exhibits reduced polymerization shrinkage due to the presence of particles which have already been polymerized. Even when using duroplastics or elastomers, the mixed fiber layer acts as an additional heat insulation layer to protect the particle foam from the normally exothermic cross-linking processes. Virtually all kinds of conventional duroplastics can be used e.g. polyurethane, epoxy resins, melanin resins, carbanide resins, formaldehyde resins or phenol resins as well as compounds containing these resins. Molded components made from the composite material produced in accordance with the invention can be easily glued to other components at e.g. the surface coated fiber layer.

The composite material in accordance with the invention is also well suited for the production of an intimate connection between molded components made from this composite material to molded components made from the same composite material or from another material. In the former case, both molded components could e.g. comprise a core made EPP surrounded by a mixed fiber layer, wherein a layer made from a rigidly curing or cross-linking polymer is introduced onto the mixed fiber layer, which is common to one of the two molded components and which binds these together. Combining of a composite material in accordance with the invention with another material can be effected in a conventional fashion using e.g. the smooth surface of the polymer introduced in the liquid phase onto the mixed fiber layer of the composite material.

In order to increase the strength of the composite material in accordance with the invention, that polymer introduced in the liquid phase onto the free surface of the mixed fiber layer can be fiber reinforced, wherein the reinforcement can comprise synthetic fibers such as glass fibers, carbon fibers, aramide fibers, metal fibers or the like and/or be effected using natural fibers such as cellulose, wood, hemp or the like.

The polymer introduced in the phase liquid onto the free surface of the mixed fiber layer can have a decorative layer at at least one visible side, in particular a foil, a fabric or the like which is either introduced onto the rigid, cured or cross-linked polymer in any conventional fashion or can be introduced onto the mixed fiber layer along with introduction of the liquid polymer. The decorative layer can e.g. comprise a veneer, such as a wood veneer, which is glued onto the smooth surface of the rigid, cured, or cross-linked polymer.

The reinforcement fibers can be conventional, e.g. glass fibers, carbon fibers, aramide fibers, cellulose fibers or metal fibers.

The mixed fiber layer can, in a conventional sense, comprise a weave, a knit, or a laid-out structure.

The invention also concerns a method for the production of a molded component using a composite material having the above mentioned structure. A method of this kind is distinguished in that the mixed fiber layer and densely packed foam particles comprising EPP and optionally an additional expanded polymer are introduced into a mold and brought to a temperature causing the surfaces of the particles and of the PP fibers of the mixed fiber layer to melt. The materials are then cooled down and, subsequent thereto, the rigidly curing or cross-linking polymer is introduced in the liquid phase onto the free surface of the mixed fiber layer.

The term "mold" refers, in this context, to any means which can impart shape, leading to a plate shaped, a three dimensionally shaped or to hollow molded components. The densely packed EPP particles and the mixed fiber layer are brought to a temperature at which the particles only melt at the surfaces thereof and weld to each other. Since the mixed fiber layer contains PP fibers, these fibers also melt so that a materially interlocking connection occurs between the mixed fiber layer and the particle foam. Subsequently, as already mentioned, a liquid-melt thermoplastic or a curing or cross-linking polymer (elastomer or duroplastic) is introduced onto the mixed fiber layer in the liquid phase using any arbitrary technique and the desired molded component is obtained after hardening, curing, or cross-linking. The hardening, cross-linking or curing polymer can, as already mentioned, also be used to bind two molded components to each other which have a core or a layer comprising EPP particle foam.

Alternatively, the cover layer can be prefabricated by e.g. impregnating the mixed fiber layer with the hardening, curing or cross-linking polymer. One should thereby only take care that the polymer does not penetrate through to the other side of the mixed fiber layer. Subsequent thereto, the foam particles are introduced onto the free surface of the mixed fiber layer, wherein they simultaneously undergo an intimate connection to the PP fibers of the fiber layer.

The foam particles and the mixed fiber layer can be brought to the melting temperature using a diffusing gas, e.g. hot steam. This method leads to an intimate connection between the PP fibers and among the EPP particles themselves, due to the diffusion-open mixed fiber layer.

Alternatively, the foam particles and the mixed fiber layer can be brought to the melting temperature using microwave energy, optionally with the assistance of a microwave absorbing agent.

An embodiment of the method in accordance with the invention provides for the introduction of synthetic and/or natural reinforcement fibers into hardening, curing or cross-linking polymer introduced onto the free surface of the mixed fiber layer in the liquid phase. If the polymer is e.g. a thermoplastic which is extruded onto the mixed fiber layer, the reinforcing fibers can be introduced to an extruder in a region of the extruder screw at which the thermoplastic is substantially completely plasticized. The reinforcement fibers can be added to the liquid polymer in any arbitrary manner, independent of whether or not the polymer is a thermoplastic, an elastomer or a duromer.

In accordance with an additional embodiment, a decorative layer is introduced on a visible side of the polymer introduced in the liquid phase, such as a foil, a fabric or the like. Towards this end, and in a preferred embodiment therefor, the decorative layer is simultaneously introduced onto the mixed fiber layer together with the polymer via back spraying, back pressing or the like. In this fashion, the polymer in the liquid phase can e.g. be introduced onto the composite material comprising the particle foam and the mixed fiber layer in such a fashion that the composite and decorative layer are introduced into a mold and the liquid polymer, optionally comprising reinforcement fibers, is introduced between the composite material and the decorative layer using any conventional technique. The smooth surface of the hardened, cured or cross-linked polymer can also subsequently be provided with a decorative layer in a straightforward fashion, e.g. with a glued wood veneer.

BRIEF DESCRIPTION OF THE DRAWING

The invention is described below in preferred embodiments with reference to the drawing.

DESCRIPTION OF THE PREFERRED EMBODIMENT

Figure 1:
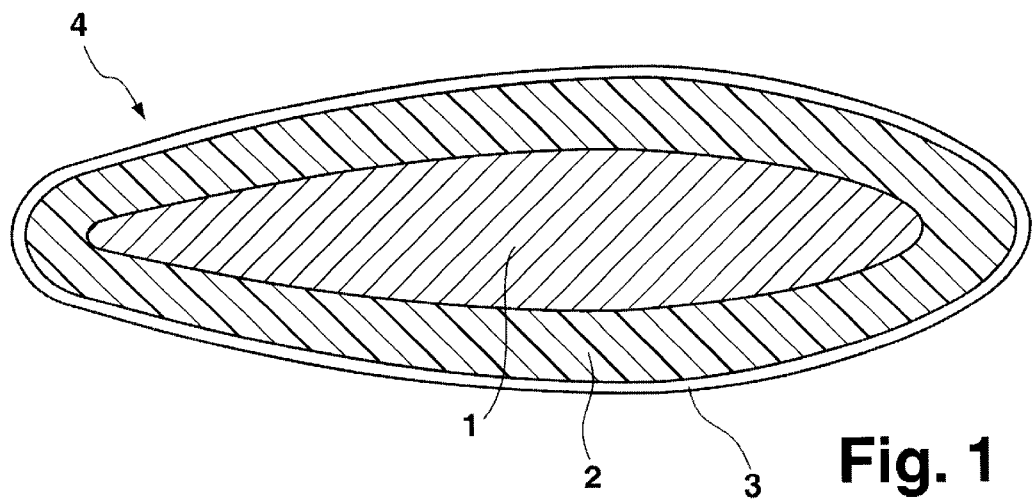
FIG. 1 shows a cross section of a molded component having a composite material produced in accordance with the invention.

The molded component 4 shown in FIG. 1, e.g. a surfboard, has a core comprising a particle foam 1 which can consist essentially of EPP or from a compound foam comprising EPP and an additional expanded polymer. A mixed fiber layer 2 surrounds the particle foam 1 and contains a fraction of PP fibers which are welded to the EPP contained in the particle foam 1 so that an intimate connection between the core and the mixed fiber layer 2 is given. In addition, the mixed fiber layer comprises reinforcement fibers, e.g. glass fibers or carbon fibers, having suitable wetability for a hardened, cured or cross linked polymer 3 e.g. polyurethane introduced in the liquid phase onto the free surface of the mixed fiber layer 2. The surface layer 3 can also have a sandwich type construction comprising a plurality of layers disposed one over another comprising the hardened or cross-linked polymer. The surface layer 3 reinforces the surfboard and is made e.g. from a duroplastic (polyurethane) and effects an abrasion resistant and scratch resistant surface with good spray properties which is permanently and intimately connected to the mixed fiber layer 2.

Figure 2:
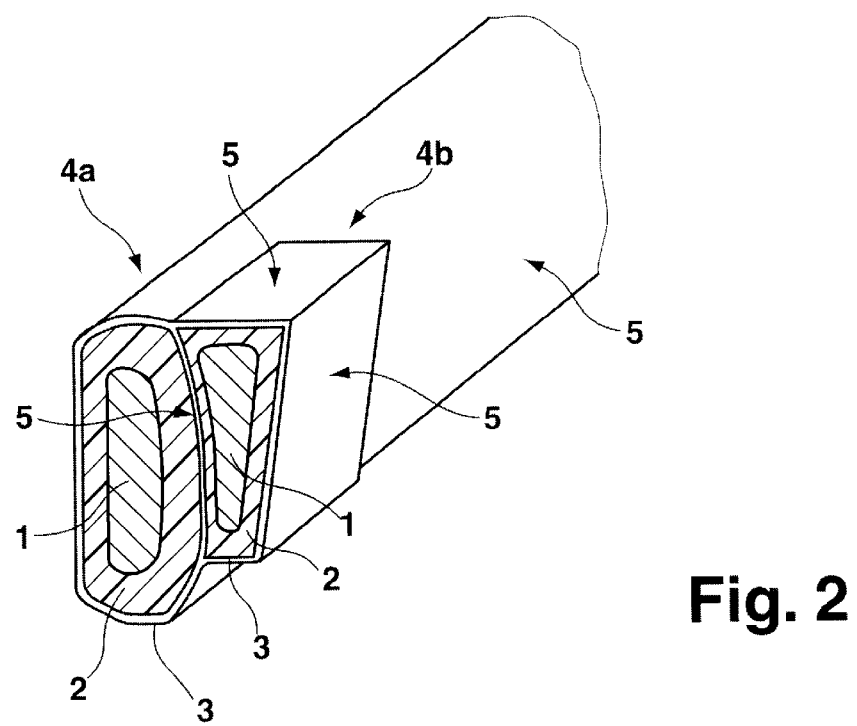
FIG. 2 shows a cross section through two molded components connected to each other and comprising a composite material in accordance with the invention.

FIG. 2 shows a connection between two molded components 4a, 4b comprising a composite material in accordance with the invention, e.g. a housing 4b introduced onto the dashboard 4a of a motor vehicle. Both molded components 4a, 4b comprise an expanded particle foam 1, a mixed fiber layer 2 surrounding this foam, and an additional layer introduced onto the outer side of the mixed fiber layer 2 comprising a hardened, cured or cross-linked polymer 3. A decorative layer 5 e.g. a foil, a fabric or the like is disposed on the visible side of the polymer 3.

The polymer layer 3, introduced in the liquid phase, binds the two molded components 4a, 4b to each other at their abutment region 6. A connection of this kind is of high strength so that all kinds of molded components comprising a composite material in accordance with the invention having a EPP core can be joined together in a permanent fashion either over a wide area or in the form of a but joint. The polymer layer 3 can be thermoplastic, elastic or duroplastic.

I claim:

1. A method for manufacturing a composite material comprising a particle foam consisting essentially of at least one of an expanded polypropylene and an expanded polymer, a mixed fiber layer comprising a first fraction of polypropylene fibers welded to said particle foam and a second fraction of first reinforcement fibers, said mixed fiber layer having a wetability, and with a polymer layer introduced onto said mixed fiber layer in a liquid phase, said polymer layer being one of hardened, cured, and cross-linked, the method comprising the steps of:

a) densely packing said particle foam;

b) introducing said densely packed particle foam and said mixed fiber layer into a mold;

c) bringing, following step b), said particle foam and said mixed fiber layer to a temperature sufficient to melt surfaces of particles in said particle foam and of polypropylene fibers in said mixed fiber layer;

d) cooling said particle foam and said mixed fiber layer following step c);

e) introducing a polymer layer in a liquid phase onto a surface of said mixed fiber layer; and f) effecting, following step e), at least one of a hardening, a curing, and a cross-linking of said polymer layer.

2. The method of claim 1, wherein step c) comprises use of a diffusing, hot gas.

3. The method of claim 1, wherein step c) comprises use of microwave energy.

4. The method of claim 1, wherein step c) comprises the step of including at least one of synthetic and natural reinforcing fibers in said polymer layer.

5. The method claim 1, wherein step e) comprises the step of introducing a decorative layer on a visible side of said polymer layer.

6. The method of claim 5, wherein said decorative layer comprises one of a foil and a fabric.

7. The method of claim 5, wherein step e) further comprises introducing said decorative layer onto said mixed fiber layer together with said polymer layer using one of spraying and pressing.

* * * * *

UNITED STATES PATENT AND TRADEMARK OFFICE
CERTIFICATE OF CORRECTION

PATENT NO. : 6,416,614 B1
DATED : July 9, 2002
INVENTOR(S) : Ziegler, Maik

It is certified that error appears in the above-identified patent and that said Letters Patent is hereby corrected as shown below:

<u>Title page,</u>
Please replace "(22) PCT filed: March 29, 1999" with -- (22) PCT filed: March 26, 1999 --.

Signed and Sealed this

Nineteenth Day of November, 2002

Attest:

JAMES E. ROGAN
*Attesting Officer*   *Director of the United States Patent and Trademark Office*